United States Patent Office 2,727,887
Patented Dec. 20, 1955

2,727,887

COPPERABLE POLYAZO DYESTUFFS

Werner Bossard, Riehen, near Basel, and Otto Bitterlin, Basel, Switzerland, assignors to J. R. Geigy A. G., Basel, Switzerland, a Swiss firm No Drawing. Application April 10, 1952,
Serial No. 281,683

Claims priority, application Switzerland April 23, 1951

3 Claims. (Cl. 260—173)

The present process concerns the production of polyazo dyestuffs, the cellulose dyeings of which have very pure bluish-red shades, have very good fastness to light and extraordinarily good wet fastness properties. They are a valuable addition to the range of direct drawing azo dyestuffs for cellulose fibres which can be fixed fast to light and wetness by coppering.

The polyazo dyestuffs according to the present invention are obtained by coupling 2 mols of diazotised 2-amino-1-hydroxybenzene-4-methyl sulphone with 1 mol of a coupling component of the general formula:

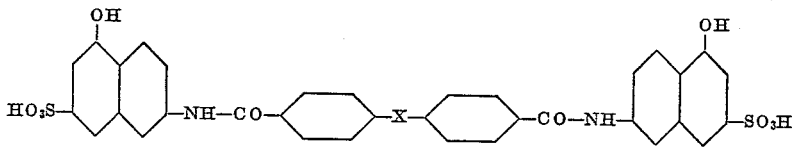

wherein X represents an azo, azoxy or urea linkage. The new polyazo dyestuffs correspond to the formula

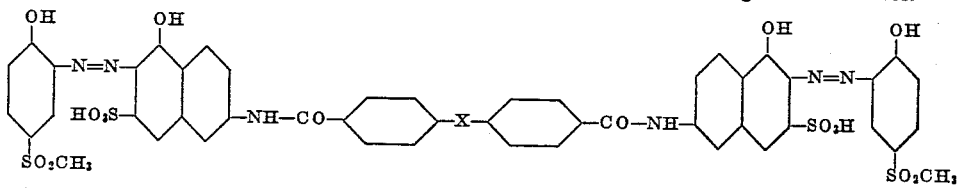

wherein X has the aforesaid significance.

The coupling components usable according to the present invention are obtained from 2-(4'-nitrobenzoylamino)-5-hydroxynaphthalene-7-sulphonic acid either by reducing the nitro group to the primary amino group and treating the amino compound with phosgene so that 2 molecules are joined by a urea linkage, or they can be obtained by reducing the nitro group in an alkaline medium, e. g. with glucose whereby two molecules are joined by the formation of an azoxy or azo linkage.

Also, the following modifications of the process come into consideration for the production of the dyestuffs according to the present invention: the coupling of 1 mol of diazotised 2-amino-1-hydroxybenzene-4-methyl sulphone with 1 mol of 2-(4'-nitrobenzoylamino)-5-hydroxynaphthalene-7-sulphonic acid to form the nitro monoazo dyestuff and reduction of the nitro group, either in an alkaline medium with glucose so that two dyestuff molecules are joined by the azo or azoxy group or by one of the usual methods, to the primary amino group and finally linking 2 molecules of the aminomonoazo dyestuff with phosgene to form the urea derivative. Also 1 mol of diazotised 2-amino-1-hydroxybenzene-4-methyl sulphone can be coupled with 1 mol of 2-(4'-aminobenzoylamino)-5-hydroxynaphthalene-7-sulphonic acid to form the amino monoazo dyestuff and finally this may be treated with phosgene.

In the form of their easily soluble alkali salts the polyazo dyestuffs according to the present invention are dark powders which dissolve in water with a violet colour and in concentrated sulphuric acid with a red colour. They are distinguished by a very good affinity to cellulose fibres and dye such fibres in pure bluish-red shades from a bath containing Glauber's salt according to the usual method. The bath is exhausted to a great extent. Very good light, perspiration- and wet-fastness dyeings can be fixed by a treatment with agents yielding copper.

The direct cellulose dyeings can be coppered either in the dye bath or in a fresh bath with the usual copper salts, e. g. copper acetate or copper sulphate, in a neutral to weakly acid aqueous solution. If desired, copper compounds which are stable to alkalies may be used such as are obtained for example by reacting copper sulphate with sodium tartrate in a soda alkaline bath.

The following examples illustrate the invention. Where not otherwise stated, parts are given as parts by weight and the temperatures are in degrees centigrade. The relationship of parts by weight to parts by volume is that of kilogrammes to litres.

Example 1

18.7 parts of 2-amino-1-hydroxybenzene-4-methyl sulphone are dissolved in 200 parts of water with the addition of 15 parts of concentrated hydrochloric acid and diazotised at 10° with 6.9 parts of sodium nitrate. The suspension obtained is poured at 30° into a solution of 38.8 parts of 2-(4'-nitrobenzoylamino)-5-hydroxynaphthalene-7-sulphonic acid in 1500 parts of water, 3.6 parts of sodium hydroxide and 4 parts of soda. As soon as the coupling is complete, the monoazo dyestuff which has crystallised into fine small needles is filtered off. The dyestuff is dissolved at 70° in 1000 parts of water and 4.1 parts of sodium hydroxide. 32 parts of sodium hydroxide and 17.3 parts of glucose are added and the whole is kept for an hour at this temperature while stirring. 100 parts of common salt are then added and the dyestuff which precipitates in the form of bronze-shimmering longish little needles is filtered off. It corresponds to the formula

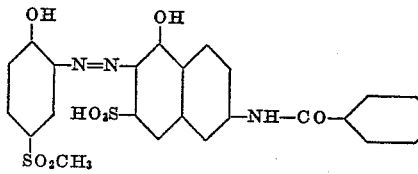 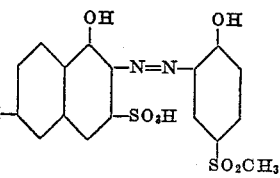

The side products resulting from the reduction are washed away with a warm 5% common salt solution. When dry, the dyestuff is in the form of a dark powder which dissolves in water with the addition of soda with a violet colour and in concentrated sulphuric acid with a red

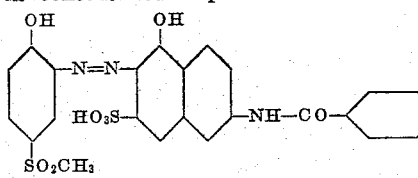

colour. It draws very well on to natural or regenerated cellulose fibres. After treating with copper salts according to the usual methods, pure bluish-red shades are obtained which have excellent fastness to washing and light.

*Example 2*

38.8 parts of 2-(4'-nitrobenzoylamino)-5-hydroxynaphthalene-7-sulphonic acid are dissolved in 200 parts of water and 4.0 parts of sodium hydroxide at 40° and 16 parts of sodium hydroxide and 17.3 parts of glucose are added. The whole is stirred for some hours at this temperature, 50 parts of common salt and 25 parts of conc. hydrochloric acid are added, the monoazo dyestuff formed is filtered off and washed free of side products with 10% common salt solution. The monoazo dyestuff is dissolved in 1500 parts of water and 3.6 parts of sodium hydroxide at 40°. 40 parts of soda are added to the solution of the monoazo dyestuff and then the suspension of the diazo compound produced according to Example 1 from 18.7 parts of 2-amino-1-hydroxybenzene-4-methyl sulphone is added to the monoazo dyestuff solution. When the coupling is complete, 8 parts of sodium hydroxide and 250 parts of common salt are added, the trisazo dyestuff is filtered off and washed with 10% common salt solution. The dyestuff has the same properties as that described in Example 1.

*Example 3*

Phosgene is introduced into a 40° warm solution of 35.8 parts of 2-(4'-aminobenzoylamino)-5-hydroxynaphthalene-7-sulphonic acid in 700 parts of water and 5 parts of sodium hydroxide until a sample can no longer be diazotised. At the same time, a 20% soda solution is added dropwise so that there is always a very slight acid reaction to litmus. The whole is heated to 60°, 5% by volume of common salt is added and the urea which precipitates is filtered off. The urea is dissolved in 1000 parts of water and 6 parts of sodium hydroxide and then 12.5 parts of sodium bicarbonate and the diazonium compound obtained according to Example 1 from 18.7 parts of 2-amino-1-hydroxybenzene-4-methyl sulphone is added. The next day, the suspension is heated to 95°, 4% by volume of common salt is added and the dyestuff is filtered off and washed with a hot 3% common salt solution to remove the impurities. When dry, the dyestuff, which corresponds to the formula

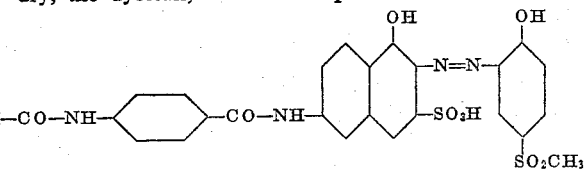

is a dark powder which dissolves in water with a violet and in concentrated sulphuric acid with a red colour. It dyes cellulose fibres in bluish red shades which become still purer after treatment with copper salts. The dyeings have very good light- perspiration- and wet-fastness properties.

The same dyestuff with the same fastness properties can be obtained if the diazonium compound obtained from 18.7 parts of 2-amino-1-hydroxybenzene-4-methyl sulphone is coupled with 35.8 parts of 2-(4'-aminobenzoylamino)-5-hydroxynaphthalene-7-sulphonic acid and the monoazo dyestuff so obtained is treated with phosgene in a weakly alkaline solution until a sample can no longer be diazotised and then worked up as described above.

*Example 4*

1 part of the dyestuff obtained according to Example 1 is dissolved in a dyebath containing 3000 parts of water and 2 parts of soda. 100 parts of cotton are entered at 40–50°, the bath is heated to 90–95° within 30 minutes, 30 parts of sodium sulphate are added and dyeing is performed for 45 minutes at this temperature. The dye bath is nearly completely exhausted at the end of this time. The dyed goods are rinsed cold and treated for 30 minutes in a fresh bath containing 2 parts of crystallised copper sulphate in 2000 parts of water and 2 parts of 40% acetic acid. The goods are rinsed and dried in the usual way. The cotton is dyed in pure bluish-red shades which have very good washing-, water-, perspiration- and light-fastness properties.

What we claim is:

1. A polyazo dyestuff having the general formula:

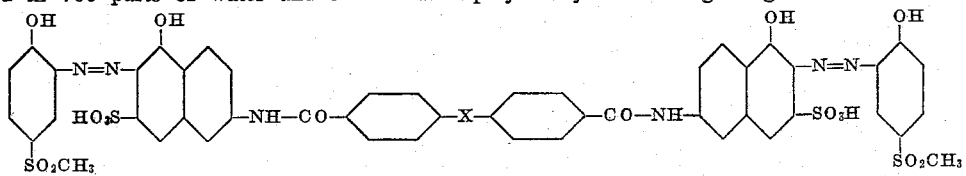

wherein X represents a member selected from the group consisting of —N=N—, and —NH—CO—NH—

2. A polyazo dyestuff having the formula:

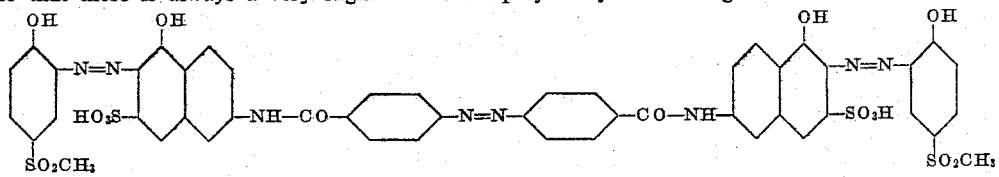

3. A polyazo dyestuff having the formula:

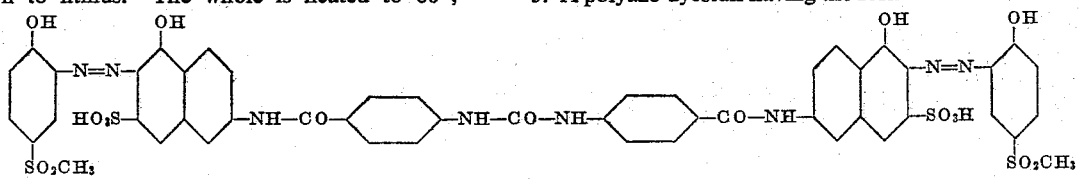

References Cited in the file of this patent

UNITED STATES PATENTS

| | | |
|---|---|---|
| 1,558,890 | Kalischer et al. | Oct. 27, 1925 |
| 2,228,289 | Suckfull et al. | Jan. 14, 1941 |
| 2,341,791 | Kaiser | Feb. 15, 1944 |

OTHER REFERENCES

Georgievics et al.: "Dye Chemistry" (1920), pp. 4 and 85.